UNITED STATES PATENT OFFICE.

GEORGE MAGNANI, OF YONKERS, NEW YORK, ASSIGNOR OF ONE-HALF TO LORENZO DIRIZIO, OF YONKERS, NEW YORK.

WOOD COMPOSITION.

1,364,776.     Specification of Letters Patent.     Patented Jan. 4, 1921.

No Drawing.     Application filed December 26, 1919. Serial No. 347,537.

*To all whom it may concern:*

Be it known that I, GEORGE MAGNANI, a citizen of the United States, and a resident of Yonkers, in the county of Westchester and State of New York, have invented new and Improved Wood Compositions, of which the following is a full, clear, and exact description.

This invention relates to improvements in wood composition, an object of the invention being to provide a wood composition which will be strong and durable, and which will have a highly polished surface, so that the material thus made is specially adapted for use in the manufacture of picture frames or other devices where highly finished surfaces are desirable.

A further object is to provide a composition of material which is composed of a novel arrangement of ingredients, mixed in novel proportions, and molded or shaped in a novel way to produce the desired result.

With these and other objects in view, the invention consists in certain novel ingredients, their manner of mixing, and their proportions as will be more fully hereinafter described and pointed out in the claims.

In manufacturing my improved wood composition, I employ a mixture of wood pulp, starch, rosin, wheat flour, boiled linseed oil, and water in substantially the following proportions:

| | |
|---|---|
| Wood pulp | 1 pound |
| Starch | 1 pound |
| Rosin | ½ pound |
| Wheat flour | ¼ pound |
| Boiled linseed oil | 1 gill |
| Water | 1 quart |

These ingredients are thoroughly mixed together while cold, employing any desired form of agitating device to thoroughly co-mingle the ingredients and bring the material to a pulpy mass.

The material is then placed in suitable dies or molds and pressed. At the same time the dies are heated so that when the dies are removed the finished material will have a hot pressed highly finished outer surface, and due to the ingredients the composition will be strong and durable for the many uses to which it is capable.

As above stated, the composition readily lends itself to the manufacture of picture frames and other ornamental devices, and then the dies or molds can of course be shaped to give to the finished material any desired ornamentation and at the same time give a smooth finished outer surface.

Slight changes might of course be made in the arrangement of the ingredients and their specific proportions without departing from my invention, and hence I do not limit myself to the precise proportions stated but consider myself at liberty to make such changes and alterations as may easily fall within the spirit and scope of the invention as defined in the appended claims.

Having thus described my invention, I claim as new and desire to secure by Letters Patent:

1. The hereinafter described composition of matter, consisting in substantially equal proportions of wood pulp and starch forming a base mixed with a binder and oil.

2. The hereinafter described composition of matter comprising wood pulp and starch, mixed with rosin, wheat flour, linseed oil and water in substantially the proportions of, wood pulp one pound, starch one pound, rosin one half pound, wheat flour one quarter pound, linseed oil one gill and water one quart.

GEORGE MAGNANI.